United States Patent Office 3,460,646
Patented Aug. 12, 1969

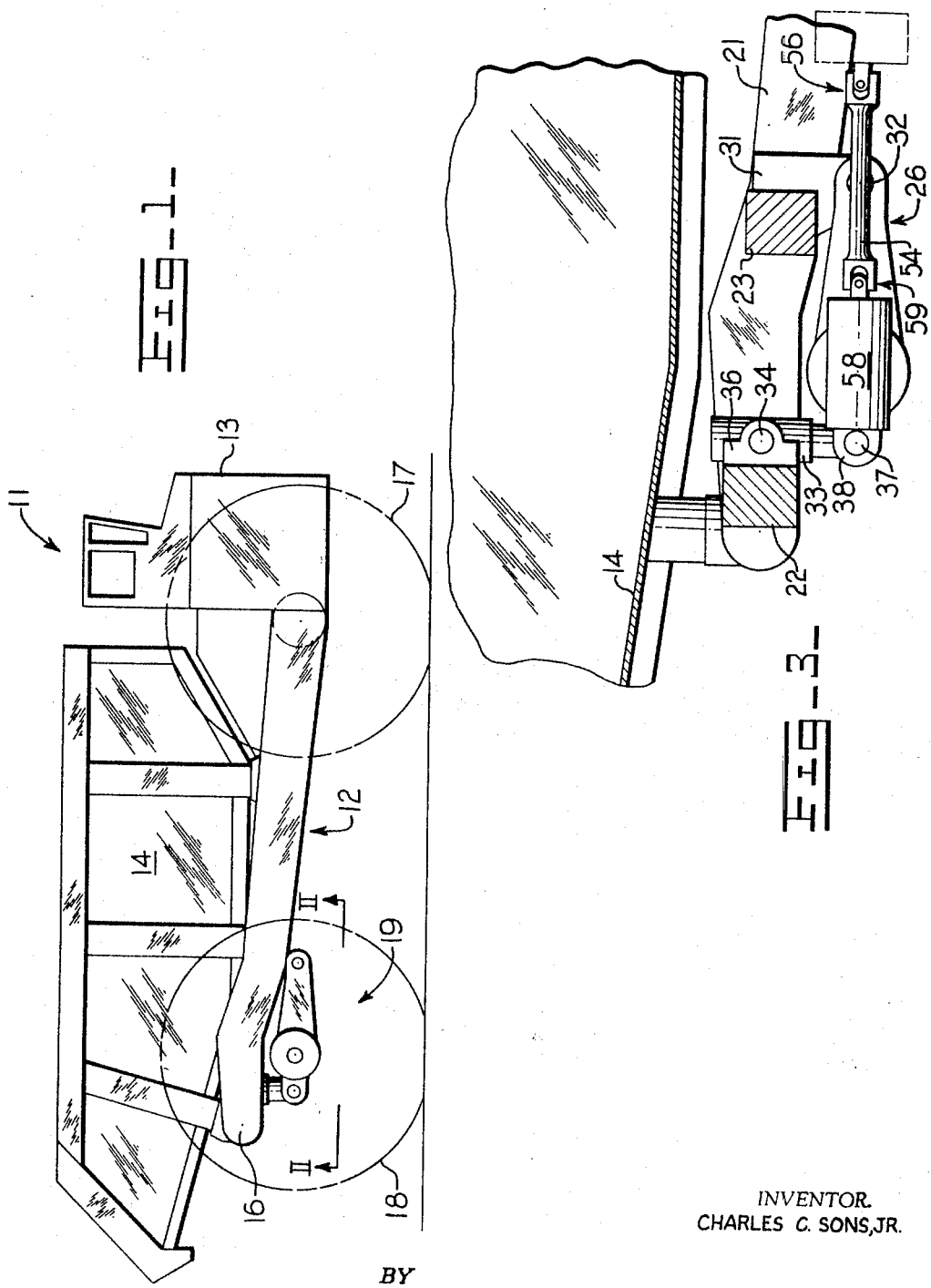

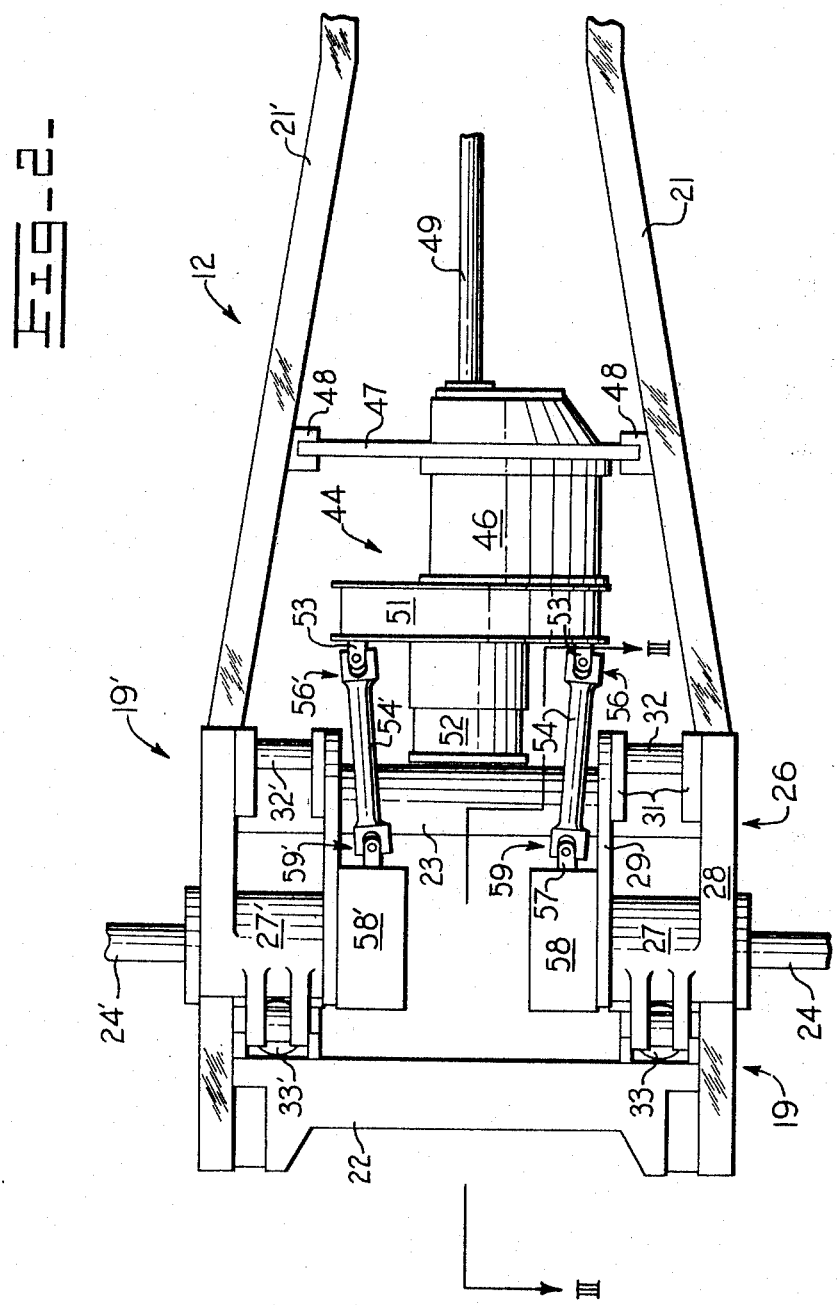

3,460,646
INDEPENDENT WHEEL SUSPENSION FOR MINIMIZING UNIVERSAL-JOINTED SHAFT WEAR
Charles C. Sons, Jr., Peoria, Ill., assignor to Caterpillar Tractor Co., Peoria, Ill., a corporation of California
Filed May 8, 1967, Ser. No. 636,881
Int. Cl. B60k *17/32*
U.S. Cl. 180—73                                   1 Claim

ABSTRACT OF THE DISCLOSURE

A strong and durable suspension provides for the individual mounting of drive wheels on a vehicle. The wheel is carried on a link pivoted at one end to the vehicle frame and coupled thereto at the other end through a resilient strut which provides for independent oscillation of the wheel in response to ground irregularities. A rotary shaft transmits drive to the wheel and has spaced universal joints to accommodate to the wheel oscillation. To minimize wearing of the drive shaft, the pivot which couples the link to the frame is situated between the universal joints.

Background of the invention

This invention relates to mechanism for mounting drive wheels on vehicles and more particularly to a high-strength and wear-resistant independent suspension for drive wheels.

Certain forms of powered vehicle may be subjected to extremely heavy loading forces while travelling over uneven terrain. Off-highway trucks, wheel tractors, and earthmoving equipment such as scrapers, are typical examples of vehicles which may be operated under these conditions.

In these circumstances, it is very desirable to provide an independent resilient suspension for each drive wheel so that each wheel may maintain contact with the ground in the presence of terrain irregularities. This avoids concentrating stress on only a few of the wheels and aids in maintaining high traction. Independent wheel suspensions also reduce road shocks and suppress the tendency of a vehicle to bounce at the natural frequency of the system.

Prior independent suspensions for drive wheels have tended to be massive and complex in order to provide adequate strength together with the needed resiliency. Such mechanisms require means for transmitting driving torque to each wheel; and since the wheel is not rigidly mounted relative to the vehicle frame, the driving connections must be jointed for repeated and rapid flexing. Wearing of these articulated drive elements has been a particular source of trouble.

Summary of the invention

This invention is an independent suspension for a drive wheel which provides for a substantial degree of wheel oscillation without requiring complex or massive components and with reduced wearing of drive elements. In a preferred form, the wheel axle is journalled in a link which is in turn coupled to the vehicle frame by a pivot so that the link and wheel are capable of vertical movement relative to the frame. The opposite end of the link is coupled to the frame through a resilient strut, preferably of air over oil type, which dampens wheel oscillations and acts to restore the normal positioning thereof. Drive is transmitted to the wheel through a rotary shaft which has two universal joints to provide the necessary flexibility. By situating the pivot connection of the link to the frame close to the midpoint between the universal joints of the drive shaft, wearing of the drive mechanism is minimized.

Accordingly, it is an object of this invention to facilitate the operation of powered vehicles on uneven terrain.

It is another object of the invention to provide a compact, high-strength, and more durable independent suspension for mounting drive wheels on heavy duty vehicles.

The invention, together with further objects and advantages thereof, will best be understood by reference to the following description of a preferred embodiment in conjunction with the accompanying drawings.

Brief description of the drawings

In the drawings, FIGURE 1 is a side elevation view of a two-axle off-highway truck having rear drive wheels mounted thereon by means of the present invention;

FIGURE 2 is a view of a portion of the undercarriage of the truck of FIGURE 1 taken along line II—II thereof and illustrating the independent suspensions which mount the rear wheels thereon, together with the mechanism for supplying drive to both wheels; and FIGURE 3 is a staggered section view taken along lines III—III of FIGURE 2 further illustrating the structure of the wheel suspension.

Description of a preferred embodiment

Referring now particularly to FIGURE 1 of the drawing, there is shown an off-highway truck 11 of the type employed for carrying extremely large loads of earth or other material. In many operations, this type of vehicle must travel over very irregular ground and is subjected to severe shocks from sharp elevations and depressions.

Such a truck 11 typically has a frame 12, an operator's cab and engine compartment 13 at the forward end, and a bed 14 for receiving the material to be hauled. The bed 14 is generally coupled to the frame 12 through pivot 16 to provide for upward pivoting of the bed to dump the contents thereof. The truck 11 in this instance rides on four very large wheels including front wheels 17 and rear wheels 18. The rear wheels 18 are the driving wheels and each is coupled to the frame 12 through an independent suspension 19.

Referring now to FIGURES 2 and 3 in conjunction, the left and right rear wheel suspensions 19 and 19' respectively are coupled to the truck frame 12 which in this example is formed in part by longitudinal members 21 and 21' connected by a rear cross-brace 22 and an intermediate cross-brace 23 situated forwardly therefrom. In this example, the portions of the longitudinal members 21 and 21' between the two cross-braces 22 and 23 are parallel while the more forwardly sections of the longitudinal members are convergent.

The two independent wheel suspensions 19 and 19' have essentially similar components except insofar as the members of one suspension are reversed in the side-to-side sense relative to the other. Accordingly, the invention will be described primarily with reference to the left wheel suspension 19, it being understood that the corresponding elements of the right wheel suspension 19', which are identified in the drawing by prime numbers, are of essentially similar construction except as herein noted.

The left rear wheel axle 24 is journalled in the rear portion of a link 26 which is in turn pivoted at its forward end to the truck frame 12. As will hereinafter be discussed in more detail, this provides for independent, largely vertical, movement of the axle 24 relative to the frame 12. Such movement is also independent of movements of the axle 24' of the opposite wheel suspension 19'. To provide for high strength in this coupling, the link 26 is preferably made very broad in relation to the diameter of axle 24 and may be formed of a sleeve portion 27 which receives the axle and parallel arms, including an outer arm 28 and inner arm 29, which extend forwardly. A pair of spaced apart brackets 31 project downwardly from cross-brace 23 between the arms 28 and 29 of link 26 and a transverse pivot pin 32 secures the arms thereto.

To produce a resilient force tending to pivot link 26 and wheel axle 24 downwardly about pin 32, a resilient strut 33 is coupled between the rearward end of the link and frame 12. Strut 33 in this example is a longitudinally compressible fluid cylinder preferably of the air over oil type.

Bending stresses on the strut 33 are avoided by coupling the strut to the frame 12 through trunnions 34 which engage in brackets 36 on the rear cross-member 22 of the frame. The lower end of strut 33 is coupled to the link 26 by a transverse pivot pin 37 transpierced through a pair of brackets 38 which project rearwardly from the link. Thus the strut 33 may oscillate in a fore and aft direction to accommodate to the movement of link 26 about its pivot 32.

It is possible to power each axle 24 by a separate hydrostatic or electric motor carried on each link 26 at sleeve 27. However, where a single motor drives all wheels, a split drive system 44 is needed to accommodate to the independent movement of the two suspensions. The split drive 44 is associated with a transmission 46 which is situated between the longitudinal frame members 21 and 21′ forwardly from the frame cross-brace 23. Transmission 46 is held in this position by a flat cross-member 47 which extends sideways to connect to brackets 48 on frame members 21 and 21′. A main drive shaft 49 extends forward from the transmission 46 to connect with the vehicle engine.

A spreader box 51 and differential 52 are carried at the back end of the transmission 46, suitable detailed constructions for these components being known to the art. The spreader box 51 has two rotary outputs 53 spaced apart to transmit drive to separate ones of the rear wheel suspensions 19 and 19′. Each output 53 is coupled to a separate one of a pair of drive rods 54 through a forward universal joint 56. Each such drive rod 54 extends rearwardly and is coupled to a drive input 57 at a bevel gear housing 58 through a rear universal joint 59. The universal joints 56 and 59 are of the type which provide for some axial extension and contraction in the driving connection between spreader 51 and housing 58. The bevel gear housing 58 is carried on pivotable link 26 and transmits the drive to the associated wheel axle 24.

In operation, the strut 33 exerts a downward force against the associated link 26 thereby tending to maintain drive wheel 18 in contact with the ground irrespective of depressions therein. Inasmuch as link 26 may also pivot upwardly about pin 32 against the force of the associated strut 33, the vehicle is able to override many small elevations without a corresponding upward movement of the vehicle as a whole. Since the two suspensions 19 and 19′ are independent of each other with respect to such movements, the reactions of one do not affect the other. Accordingly, road shocks, bounce, and other undesired reactions are reduced and the overall ride quality of the vehicle is greatly improved. More constant traction is maintained and skidding is reduced. Since the struts 33 may oscillate in a fore and aft direction and since the pivotable links 26 are strongly fixed against any movement other than the pivoting action hereinbefore described, these results are accomplished without imposing significant bending stresses upon the resilient struts 33.

Vehicles of the type which employ a split drive 44 to transmit torque to independently suspended wheels have heretofore been subject to very rapid wearing of the joints, such as joints 56 and 59, which are necessarily present in the flexible drive rods 54. Considering now an important advantage of the present invention, wearing of these joints 56 and 49 is minimized by proportioning the above described structure to locate the pivots 32, which couple links 26 to the truck frame 12, in the region between the forward and rearward universal joints 56 and 59 of the associated drive rod 54. As best shown in FIGURE 3, wearing is minimized when the pivots 32 are located at a longitudinal position on the vehicle corresponding to that of the point on rods 54 which is midway between the universal joints 56 and 59. Under this condition, the flexing of the joints 56 and 59 from pivoting movement of the associated links 26 is distributed approximately equally between the two joints. Stress and wear are therefore equalized rather than being relatively more concentrated at one or the other of the joints 56 and 59.

This principle may also be applied to the vertical relationship between pivots 32 and universal joints 56 and 59. In particular, pivots 32 may be situated so that the pivot axis thereof transects the rods 54 midway between joints 56 and 59 as shown in FIGURE 3. The vertical position of pivots 32 will necesarily change as the loading of the truck 11 is changed since increased weight compresses the strut 33. Further, momentary vertical movements of the rods 54 relative to pivots 32 accompany wheel oscillations. However in any given vehicle, there exists a normal condition in which the struts 33 are compressed a specific amount by a rated load and in which the wheel 18 is not undergoing an upward or downward oscillation from a terrain irregularity. For optimum results, the suspension structure is proportioned so that the axis of pivots 32 transects the rods 54 under this normal condition.

While the invention has been described with reference to the rear wheels of a two-axle truck, the structure may readily be adapted to diverse other types of vehicles and to wheels occupying other positions thereon.

What is claimed is:

1. Mechanism for independently suspending a pair of drive wheels on a vehicle having a frame and drive transmitting means with a spreader and a pair of drive rods coupled thereto to supply torque to each of said wheels separately and wherein said drive rods each have a pair of spaced apart, flexible joints to accommodate to vertical movements of said wheels, comprising;
   - a pair of links disposed at opposite sides of said frame and each carrying one of said wheels;
   - a pair of resilient elements each coupled between a separate one of said links and the adjacent portion of said frame; and
   - a pair of coaxial pivots each coupling one of said links to the adjacent portion of said frame, the common axis of said pivots being transverse to said frame and intersecting each of said drive rods midway between said flexible joints thereof when said resilient elements are compressed to the extent corresponding to a normal loading of said vehicle.

References Cited

UNITED STATES PATENTS

| 2,002,402 | 5/1935  | Konopka | 180—73 |
| 2,182,248 | 12/1939 | Chayne  | 180—73 |
| 2,240,317 | 4/1941  | Swenson | 180—73 |
| 3,175,637 | 3/1965  | Honda.  |        |

A. HARRY LEVY, Primary Examiner